US009933546B2

(12) United States Patent
Edwards et al.

(10) Patent No.: US 9,933,546 B2
(45) Date of Patent: Apr. 3, 2018

(54) DISPLACEMENT MEASUREMENTS USING A MULTI-CAVITY SENSOR

(71) Applicants: Carl M. Edwards, Katy, TX (US); Ian Turner, Bedford, MA (US)

(72) Inventors: Carl M. Edwards, Katy, TX (US); Ian Turner, Bedford, MA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 14/863,897

(22) Filed: Sep. 24, 2015

(65) Prior Publication Data

US 2017/0090064 A1 Mar. 30, 2017

(51) Int. Cl.
| | | |
|---|---|---|
| *G01V 8/22* | (2006.01) | |
| *G01J 9/02* | (2006.01) | |
| *G01H 9/00* | (2006.01) | |
| *G01P 15/093* | (2006.01) | |
| *G02B 5/28* | (2006.01) | |

(52) U.S. Cl.
CPC .............. *G01V 8/22* (2013.01); *G01H 9/004* (2013.01); *G01J 9/0246* (2013.01); *G01P 15/093* (2013.01); *G01V 2210/1429* (2013.01); *G02B 5/284* (2013.01)

(58) Field of Classification Search
CPC ......... G01L 9/0079; G01J 3/26; G01J 9/0246; G02B 26/001; G02B 5/284; G02B 6/29358; G01V 8/22; G01V 2210/1429; G01P 15/093; G01H 9/004
USPC ................................................. 356/484, 519
See application file for complete search history.

(56) References Cited

U.S. PATENT DOCUMENTS

| | | | | |
|---|---|---|---|---|
| 4,822,998 A | * | 4/1989 | Yokota ...................... | G01J 3/26 250/226 |
| 5,151,585 A | * | 9/1992 | Siebert ...................... | G01J 9/02 250/201.9 |
| 6,829,092 B2 | * | 12/2004 | Amm .................. | G02B 26/0808 359/291 |
| 8,848,187 B2 | * | 9/2014 | Uematsu ................... | G01J 3/02 356/416 |

(Continued)

FOREIGN PATENT DOCUMENTS

WO 2008064470 A1 6/2008

OTHER PUBLICATIONS

Iinternational Search Report and the Written Opinion of the International Searching Authority, or the Declaration; PCT/US2016/053275; dated Jan. 5, 2017; 7 pages.

(Continued)

*Primary Examiner* — Michael P Lapage
(74) *Attorney, Agent, or Firm* — Cantor Colburn LLP (57) ABSTRACT

An embodiment of an apparatus for estimating a parameter includes a light source configured to emit an optical signal, and an interferometer including a first reflector assembly having at least one reflective surface and a second reflector assembly having a plurality of individual reflective surfaces facing the at least one reflective surface. At least one of the first reflective assembly and the second reflector assembly is moveable in response to a stimulus, the plurality of individual reflective surfaces disposed at a fixed location relative to each other, each individual reflective surface defining a different optical cavity length relative to the first reflector assembly.

19 Claims, 9 Drawing Sheets

(56) References Cited

U.S. PATENT DOCUMENTS

| | | | | |
|---|---|---|---|---|
| 2002/0003917 | A1* | 1/2002 | Sherrer | G01L 9/0079 385/12 |
| 2002/0026981 | A1* | 3/2002 | Fukushima | G02B 5/20 156/264 |
| 2003/0035120 | A1* | 2/2003 | Myatt | G01J 9/0246 356/519 |
| 2003/0160968 | A1 | 8/2003 | Deck | |
| 2007/0148760 | A1* | 6/2007 | Klesel | G01J 1/42 435/287.2 |
| 2007/0153288 | A1* | 7/2007 | Wang | G01J 3/02 356/454 |
| 2012/0099114 | A1 | 4/2012 | Carr et al. | |
| 2012/0200852 | A1* | 8/2012 | Tejada | G01J 3/12 356/326 |
| 2012/0255363 | A1* | 10/2012 | Hawwa | G01L 9/0072 73/705 |
| 2013/0311095 | A1 | 11/2013 | Childers et al. | |
| 2014/0085727 | A1* | 3/2014 | Chen | G02B 5/201 359/589 |
| 2015/0022809 | A1* | 1/2015 | Marchant | G01J 3/26 356/303 |
| 2015/0115145 | A1 | 4/2015 | Edwards | |
| 2016/0123809 | A1* | 5/2016 | Learmonth | G01J 3/26 356/454 |

OTHER PUBLICATIONS

Islam, et al.; "Chronology of Fabry-Perot Interferometer Fiber-Optic Sensors and Their Applications: A Review"; 2014; Sensors; MDPI, Basel Switzerland; 38 pages.

Maekawa, et al.; "A Method Using Optical Contactless Displacement Sensors to Measure Vibration Stress of Small-Bore Piping"; Journal of Pressure Vessel Technology; vol. 136; Feb. 2014; ASME; 10 pages.

* cited by examiner

DISPLACEMENT MEASUREMENTS USING A MULTI-CAVITY SENSOR

BACKGROUND

In exploration for hydrocarbons, knowledge of properties of earth formations is important for being able to locate and characterize reservoirs of oil and gas. Measuring properties of earth formations, such as the location and properties of various structures, allows for the identification of such reservoirs, their potential for hydrocarbon production, and optimization of production techniques.

Optical interferometers are used in a variety of applications in the energy industry. Interferometers can be incorporated in downhole tools to measure properties such as fluid pressure, gravity and vibration. For example, gravitational measurements are performed to measure formation properties such as rock type and evaluate potential hydrocarbon reservoirs.

SUMMARY

An embodiment of an apparatus for estimating a parameter includes a light source configured to emit an optical signal, and an interferometer including a first reflector assembly having at least one reflective surface and a second reflector assembly having a plurality of individual reflective surfaces facing the at least one reflective surface. At least one of the first reflective assembly and the second reflector assembly is moveable in response to a stimulus, the plurality of individual reflective surfaces disposed at a fixed location relative to each other, each individual reflective surface defining a different optical cavity length relative to the first reflector assembly.

An embodiment of a method of estimating a parameter includes directing an optical signal from a light source to an interferometer, the interferometer including a first reflector assembly having at least one reflective surface and a second reflector assembly having a plurality of individual reflective surfaces facing the at least one reflective surface, the plurality of individual reflective surfaces disposed at a fixed location relative to each other, each individual reflective surface defining a different optical cavity length relative to the first reflector assembly. The method also includes moving at least one of the first reflective assembly and the second reflector assembly in response to a stimulus, detecting resultant signals transmitted from each cavity, estimating by a processor a transmission response associated with each optical cavity length based on the resultant signals, and estimating a value of the stimulus based on the transmission response.

BRIEF DESCRIPTION OF THE DRAWINGS

The following descriptions should not be considered limiting in any way. With reference to the accompanying drawings, like elements are numbered alike.

DETAILED DESCRIPTION

There are provided systems, apparatuses and methods for measurements using optical interferometers. An embodiment of a displacement sensor includes an interferometer (e.g., a Fabry-Perot interferometer), which may be used to measure properties or parameters such as acceleration and gravitational force. A single or multi-wavelength source is coupled to the interferometer, such as a semiconductor or solid state laser. In one embodiment, the interferometer is a multi-cavity interferometer that includes a movable reflector assembly and a fixed reflector assembly, at least one of which includes a plurality of individual reflective surfaces that form individual etalons having a different transmission response to a given stimulus (e.g., change in gravitational forced or pressure). Each individual reflective surface is fixedly located on a reflector assembly and, for a given position of the reflector assembly forms a different cavity length relative to an opposite reflective surface on an opposing assembly. In one embodiment, the moveable or fixed reflector assembly includes a substrate (e.g., a dielectric mirror) on which one or more reflective coatings are applied. The one or more reflective coatings have at least two different thicknesses to define the individual reflective surfaces.

Figure 1:
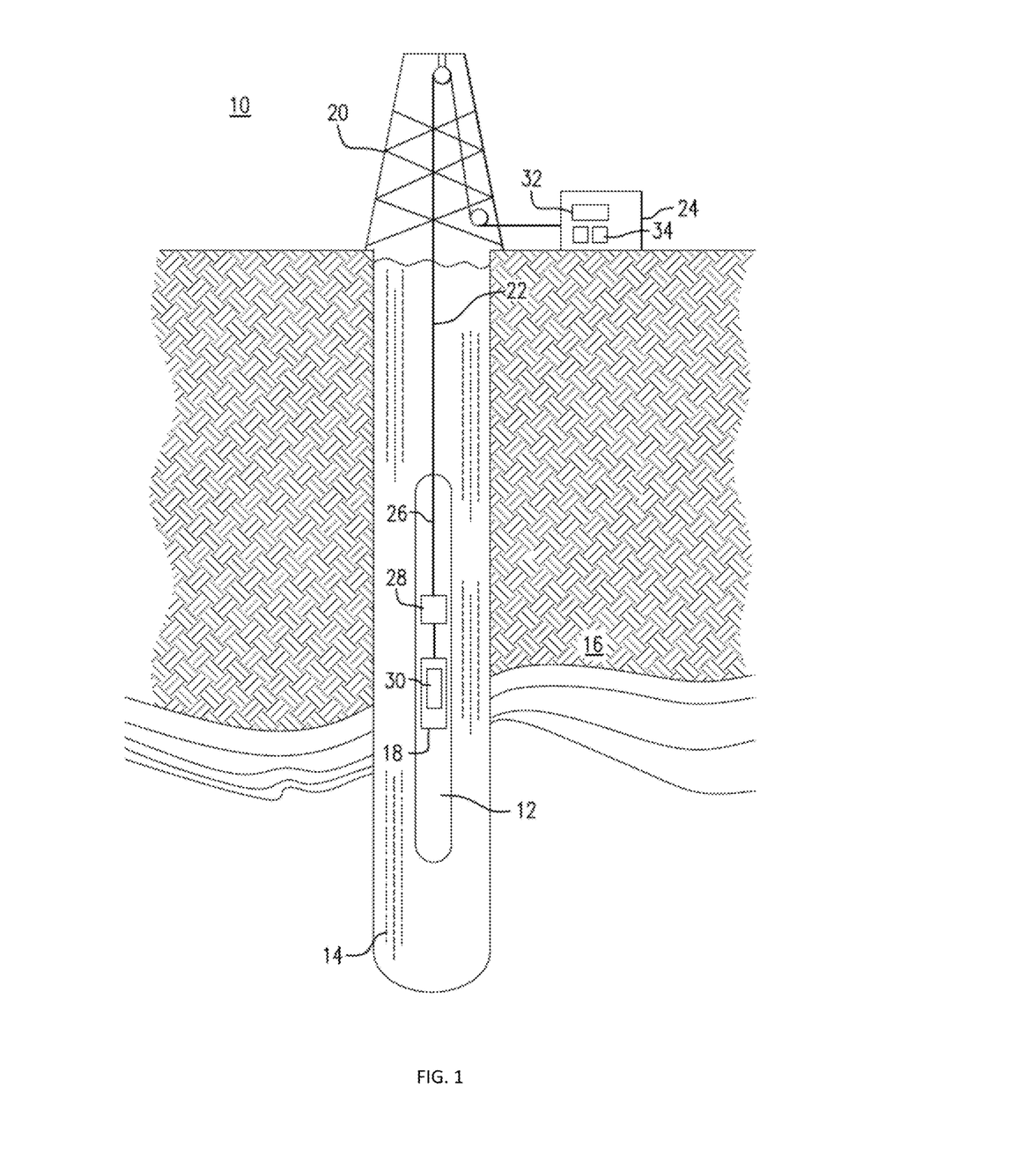
FIG. 1 depicts an exemplary embodiment of a formation measurement system.

FIG. 1 illustrates an exemplary embodiment of a system 10 that incorporates an optical displacement sensor. However, embodiments described herein are not limited to use with the system 10 and may be incorporated with any measurement system that utilizes interferometric sensors or other devices.

In the embodiment of FIG. 1, the system 10 is a downhole measurement system that includes one or more measurement tools 12 disposed in a borehole 14 in an earth formation 16. At least one of the measurement tools 12 includes one or more displacement sensors 18 for measuring one or more parameters. For example, the displacement sensor 18 is configured as an accelerometer or gravimeter for measuring the gravitational field at various locations in the formation. In this embodiment, the displacement sensor 18 is incorporated in a wireline tool 12 connected to a wellhead 20 via a wireline 22. In other embodiments, one or more sensors can be located or arrayed at the surface. Other embodiments for which the sensor 18 can be used include logging-whiledrilling, production logging, and borehole, production and/or completion monitoring. The sensor 18 may be incorporated into a moveable carrier, or incorporated into casing, cement or other components for permanent or semi-permanent installation.

The tool 12 and sensor 18 are not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include wirelines, wireline sondes, slickline sondes, drop shots, downhole subs, bottom-hole assemblies, and drill strings.

In one embodiment, the tool 12 and/or other downhole components are equipped with transmission equipment to communicate ultimately to a surface processing unit 24. Such transmission equipment may take any desired form, and different transmission media and methods may be used, such as wired, fiber optic, and wireless transmission methods. For example, the surface processing unit 24 is connected to the tool 12 and/or sensor 18 via a communication line or cable 26, which may include optical fibers and/or electrical conductors. The cable 26 can transmit command and control signals to control the tool and/or gravimeter. The cable 26 may also have other functions, including transmitting data to the surface and providing power to the tool 12 and/or other components.

Additional processing units may be disposed with the carrier. For example, a downhole electronics unit 28 includes various electronic components to facilitate receiving signals and data, transmitting data, and/or processing data downhole. The surface processing unit 24, downhole electronics unit 28, the tool 12 and/or other components of the system 10 include devices as necessary to provide for storing and/or processing data. Exemplary devices include, without limitation, at least one processor, storage, memory, input devices, output devices and the like.

In one embodiment, the displacement sensor 18 includes an optical interferometer assembly 30 coupled to a light source such as a laser array assembly or a tunable laser. Detectors are configured to receive return signals as interferometric patterns produced by the interferometer assembly 30. The light source may be located at the sensor 18 or other downhole location, or may be located at the surface, e.g., at the surface processing unit 24 or interrogator unit as shown in FIG. 1. The sensor 18 may be controlled by a processor or processing device such as the surface processing unit 24 and/or downhole electronics unit 28. Likewise, the detectors may be located borehole as part of the gravimeter and/or the interferometer assembly, or may be located at the surface and coupled to the interferometer assembly 30 by optical fibers. The interferometer assembly is also referred to simply as an interferometer, which is understood to include a fixed reflector assembly and a moveable reflector assembly, and may include additional components such as focusing devices, detectors, electronics, springs, proof masses and/or other components to facilitate measurements.

The interferometer assembly is configured as an optical displacement sensor, such as a Fabry-Perot (FP) interferometer sensor. Optical displacement sensors operate by detecting light reflected by an optical element that causes a change in the light's optical path length in response to an environmental stimulus, such as changes in gravity, acceleration, pressure differential, sound, vibration and others.

An exemplary optical interferometer is a Fabry-Perot interferometer, which includes opposing reflectors having a gap therebetween. The opposing reflectors may be referred to as etalon. The etalon defines an optically resonant cavity that distributes optical energy of an input light signal into a reflected signal and a transmitted signal. The optical energy of the transmitted signal and the ratio of optical energy in the reflected and transmitted signals depends on the wavelength of the input signal and on the cavity length of the optically resonant cavity. The cavity length corresponds to the distance between two substantially-parallel, partially or fully reflective surfaces. For example, the surfaces may be both partially reflective, or one of the surfaces may be totally reflective.

In an etalon, light can be strongly modulated by very small changes in the cavity length, and these changes can be detected using standard optical detection approaches that result in a wide dynamic range. An etalon may be configured to be sensitive to a force or acceleration stimulus by having one surface of the etalon operably connected to a surface of, or disposed on, a movable element or mass. When the element moves in response to the stimulus, the cavity length changes and, therefore, so does the ratio of optical energy in the reflected and transmitted signals. As a result, an electrical output signal based on one of the reflected and transmitted signals may be a function of the stimulus incident on the etalon.

The sensor 18 and/or interferometer may be used for various purposes, including measuring gravity, acceleration, pressure, deformation, seismic or acoustic properties, and any other properties or phenomena that can be measured using optical interferometry. Although the sensor 18 and/or other displacement sensor embodiments are described in conjunction with downhole applications, they are not so limited and can be used for a variety of measurements, including measurements performed at the surface and measurements unrelated to hydrocarbon exploration.

Figure 2:
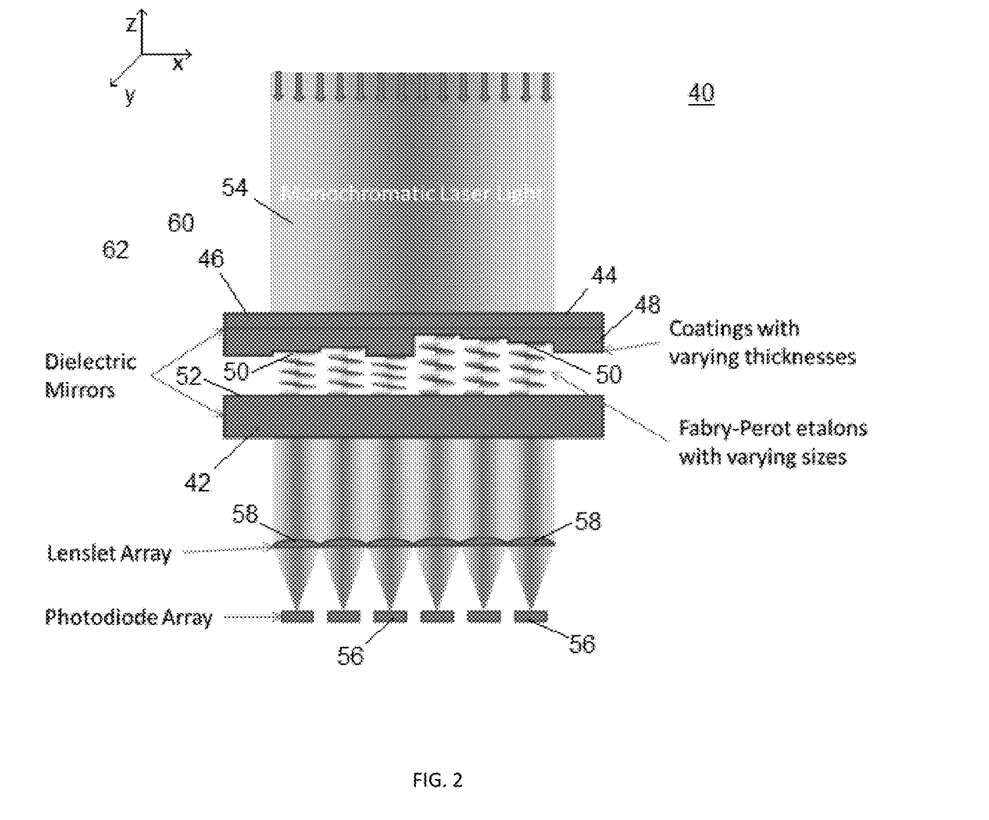
FIG. 2 depicts an embodiment of a multi-cavity interferometer configured for use with a normally incident optical signal.

FIG. 2 illustrates an embodiment of an interferometer 40. The interferometer 40 may be incorporated into an energy industry measurement device (e.g., as the assembly 30 of the system 10), but is not so limited. The interferometer 40 includes a fixed reflector assembly 42 such as a dielectric mirror, and a moveable reflector assembly 44. The moveable reflector assembly 44 moves in response to a stimulus, such as gravity, acceleration or pressure. For example, the moveable reflector assembly 44 is coupled to a spring attached to a proof mass or carrier for measurement of vibration, acceleration and/or gravity. In another example, the reflector assembly 44 is attached to a diaphragm or other component responsive to fluid pressure to measure displacement of the moveable reflector assembly 44. The reflector assemblies may be any suitable type of reflective or partially reflective material or component, such as dielectric mirrors. The reflector assemblies have respective reflecting surfaces that are at least substantially parallel. For example, as shown in FIG. 2, the reflector assemblies have opposite facing reflective surfaces in the x-y plane (separated by an initial distance typically between microns and centimeters), which is perpendicular to the axis of the interferometer 40 (the z-axis in this example).

One or both of the reflector assemblies has a variable thickness or is otherwise configured to form a plurality of parallel reflective surfaces, where at least one of the plurality of reflective surfaces has a fixed axial position (e.g. along the z-axis) relative to the other reflective surfaces on the reflector assembly. For a given axial position of the reflector assembly, each reflective surface forms a cavity length that is different than the cavity length formed by at least another of the plurality of reflective surfaces. The reflector assemblies thus form a series of individual "miniature" etalons, each with a unique response to the stimulus.

For example, as shown in FIG. 2, the moveable reflector assembly 44 includes a mirror 46 (or other substrate) on which a reflective or partially reflective coating (or coatings) 48 is applied. The coating or coatings 48 have a variable thickness, thereby producing multiple individual reflective surfaces 50 having a different distance (i.e., cavity length) from an opposing reflective surface 52 of the fixed reflector assembly 42. When an optical signal or beam (e.g., a monochromatic beam 54) impinges on the reflector assemblies, the beam is reflected within each of the plurality of individual etalons, each having a different distance between opposing reflective surfaces.

Light that reflects within each etalon and is transmitted through the reflector assembly 42 is received at one or more photodetectors 56, such as an array of photodetectors 56 each axially aligned with a respective surface 50. In one embodiment, a focusing or other light control means is provided to direct and/or focus transmitted light to the photodetector(s) 56. For example, an array of lenslets 58 is disposed between the reflector assembly 42 and the photodetectors 56. However, the lenslet array may not be needed and this could be a simplification of the manufacturing process. In the embodiment of FIG. 2, the light source is configured to apply a beam on the mirrors at normal incidence (i.e., perpendicular to the plane of the reflectors) and parallel to the interferometer axis (the z-axis in this example).

Figure 3:
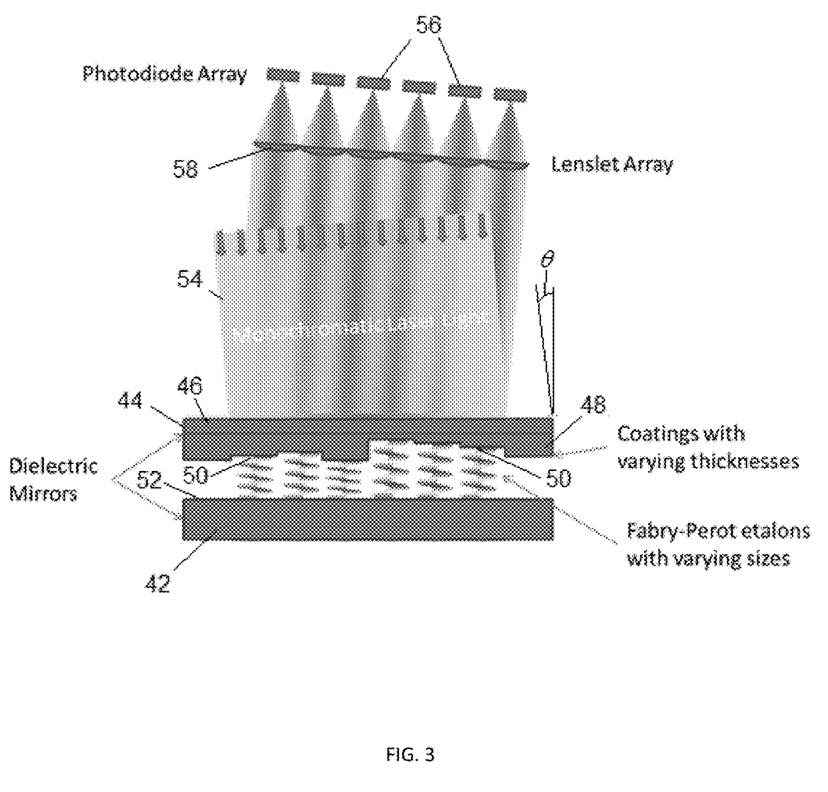
FIG. 3 depicts an embodiment of a multi-cavity interferometer configured for use with an optical signal having a selected angle of incidence.

In one embodiment, as shown in FIG. 3, the light may be incident on the reflector assemblies at an incidence angle θ, which is typically calculated with respect to the interferometer axis. The incidence angle θ is typically a very small angle normal to the mirrors, which is selected to eliminate undesirable reflections. The angle θ may be large enough to separate the reflected beam from the incoming beam, and may be kept small enough to keep the finesse factor at a suitably large value. Both transmission and reflection can be detected if the incoming beam is slightly angled.

The light at a given incidence angle has an "effective" wavelength given by:

$$\lambda_{eff} = \lambda_0/n \cos \theta, \qquad (1)$$

where n is the index of refraction of the optical medium inside the cavity, $\lambda_0$ is the wavelength of the incident light, and θ is angle of the light to normal incidence.

Figure 4:
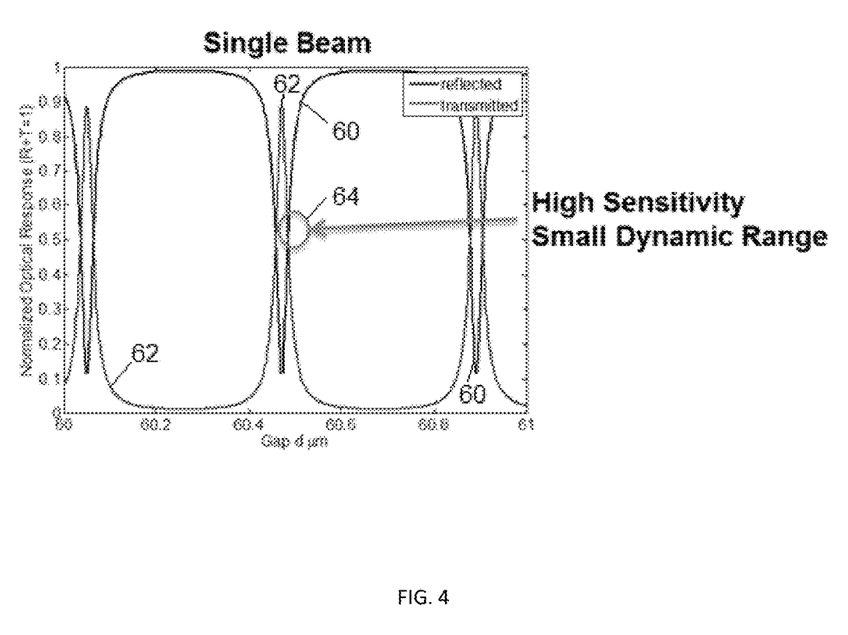
FIG. 4 depicts exemplary reflection and transmission responses to an ideal single cavity Fabry-Perot interferometer.

The response of a Fabry-Perot etalon can be very sensitive to its change in size. However, this sensitivity is limited to regions of the optical response that are near the cavity's optical resonances. For a beam entering normal to cavity reflective surfaces, resonances occur at different cavity lengths $x_m$ according to the following relationship:

$$x_m = \frac{m}{2}\lambda_{eff}, \qquad (2)$$

where m is an integer and $\lambda_{eff}$ is the effective wavelength of the light inside the cavity. The width of the resonances depends on the finesse of the cavity. The finesse of the cavity depends on the reflectivity of the reflecting surfaces (e.g., mirrors). If the finesse is large, the sensitivity can be very high. However, in between the resonances, the sensitivity can be very low. Thus, an ordinary cavity has high sensitivity but a small dynamic range. If, for example, the finesse factor is 10, the dynamic range is about 10% of $\lambda_{eff}/2$. However, the optical response is periodic and the sensitive region occurs periodically as well. This is shown in FIG. 4, which shows the optical response to change in cavity length (gap).

FIG. 4 shows an example of an ideal single cavity Fabry-Perot response to changes in cavity length, which shows the reflected response as a curve 60, and the transmitted response as a curve 62. Region 64 is one of the regions (cavity length ranges) that exhibit high sensitivity but small dynamic range. The wavelength of the light is about 800 nm (near infrared) in this example. The amplitude of the reflected beam and transmitted beams sum to one.

In one embodiment, the reflector assembly 42 and/or 44 forms individual etalons defining multiple cavities so that the response of the interferometer 40 includes multiple high sensitivity regions, e.g., in between the high sensitivity regions 64 of a single cavity etalon. The thickness of the coating or other configuration is selected to form a plurality of individual etalons that each have different cavity lengths so that multiple high sensitivity regions of the response are formed. Thus, in contrast to a single cavity reflector, the interferometer assembly produces multiple high sensitivity responses to a single stimulus.

In one embodiment, the number of etalons and/or the cavity length of individual etalons is selected to increase and/or maximize the number of transmission peaks that can be resolved. As the spacing of a single cavity is changed, a resonant response occurs every half wavelength $\lambda_{eff}/2$, where $\lambda_{eff}$ is the effective wavelength of the optical beam. The full width at half maximum of the resonant peak as a function of the etalon spacing (cavity length) as shown in FIG. 4 can be represented as:

$$\delta x = \frac{\lambda_{eff}}{2\mathfrak{F}}. \qquad (1)$$

x refers to the cavity length (distance between opposite reflective surfaces) for an etalon. $\mathfrak{F}$ is the finesse, which relates the full width half-maximum to the free spectral range (the wavelength separation between adjacent transmission peaks).

The total number of etalons in the interferometer assembly is represented by P. In order to cover the entire range of the periodic response, the total number P is selected to satisfy the following relationship:

$$P\delta x \geq \frac{\lambda_{eff}}{2}. \qquad (2)$$

Thus, the number of etalons is selected to be greater than or equal to the finesse:

$$P \geq \mathfrak{F}. \qquad (4)$$

In one embodiment, the coating thickness is varied only by a half-wavelength ($\lambda_{eff}/2$) in order to change the position of the resonance to cover the complete range. For example, the thickness of the coating for each individual etalon p is:

$$t_p = t_0 + \left(\frac{p}{P} + q\right)\frac{\lambda_{eff}}{2}; \qquad (3)$$

$$p \in \{1, 2, \ldots, P\}; q \in \{0, 1, 2, \ldots\}.$$

In this example, $t_0$ is a base coating thickness that could be zero, and q is a tolerance value, thickness value or other value, which may be zero but could be larger depending on the coating requirements. These coating thicknesses can be made using common coating and lithography techniques.

Figure 5:
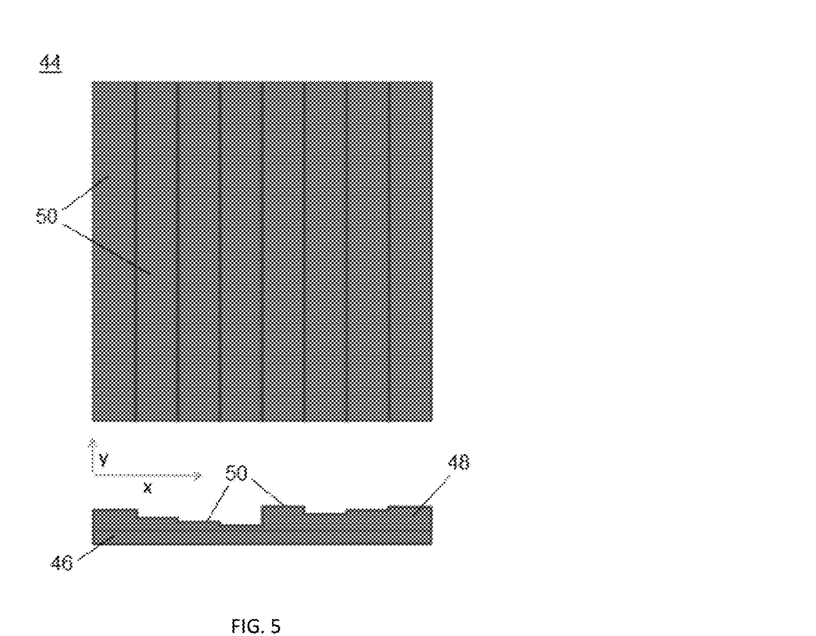
FIG. 5 depicts an example of a moveable or fixed reflector assembly having a plurality of fixedly disposed reflective surfaces, each reflective surface defining a different optical cavity length relative to an opposing reflective surface.
Figure 6:
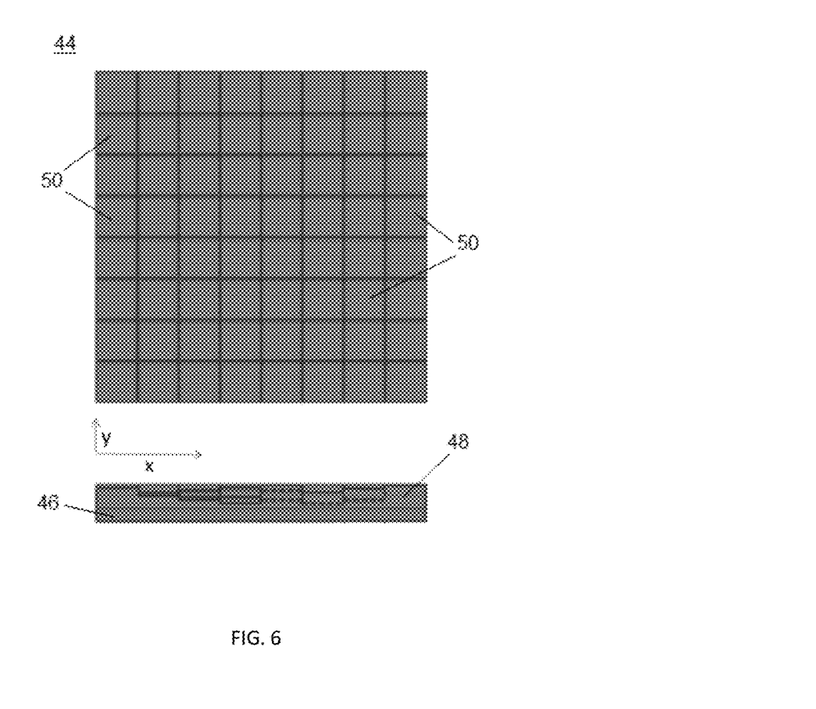
FIG. 6 depicts another example of a moveable or fixed reflector assembly having a plurality of fixedly disposed reflective surfaces, each reflective surface defining a different optical cavity length relative to an opposing reflective surface.

FIGS. 5 and 6 illustrate examples of the thickness profile of a reflector assembly, each of which shows a cross-section of the reflector assembly 44 and a view of the reflector assembly 44 in a plane parallel to the reflective surfaces. FIG. 5 shows an example of an assembly 44 having a plurality of elongated surfaces 50. In this case the coating thickness is uniform in the y direction and randomly varied in the x direction. In this example, the assembly includes eight surfaces or strips (i.e., P=8), which may be selected based on equation (5), but can be selected using other criteria. Photodetectors and/or focusing devices in this example are configured to facilitate response detection for each individual etalon. For example, lenses are arranged to focus transmitted beams in the y direction onto a linear array of photodiodes in the x direction. Alternatively, the photodetectors could be arranged in a two dimensional array and the output from the photodetectors could be averaged or summed in the y direction.

In the example of FIG. 6, the surfaces 50 are arranged in a two-dimensional array, i.e., along both the x and y directions. For example, the surfaces 50 are arranged as square patches in a two dimensional array. In the example of FIG. 6, the surfaces are arranged as an eight-by-eight array (i.e., P=64), but could be arranged in any suitable manner. For example, if P=16, the patches could be arranged in an 8×2 array or a 4×4 array.

The variation of thicknesses may be selected as desired and is not limited to the specific embodiments described herein. For example, the thicknesses need not be arranged randomly as shown in FIGS. 5 and 6. One could vary the thickness using any suitable pattern. For example, the thicknesses could be arranged to be symmetrical about the center of the reflector assembly. This would enable the detection of mirror tilt. Tilt could be an indication of instrumental error or in fact could be an indication variability of the stimulus. In the case of a gravimeter, mirror tilt might indicate the presence of a gravity gradient, or an angular tilt of the etalon with respect to direction of gravity. Another alternative would be repeating some of the coating thicknesses.

In one embodiment, the optical beam applied to the interferometer (e.g., beam 54) at a single incidence angle $\theta$ or a limited number of incidence angles $\theta$, which are constant for each of the individual etalons. This produces optical resonances that are well behaved and to a good approximation respond as shown below in equation (6).

In one embodiment, the finesse is constant across all individual etalons. However, the finesse could be varied between etalons by, e.g., coating a substrate with reflective surfaces having different reflectivity characteristics. This embodiment can provide the advantage of making determination of the sign of the optical phase of transmission responses of individual etalons easier.

Figure 7:
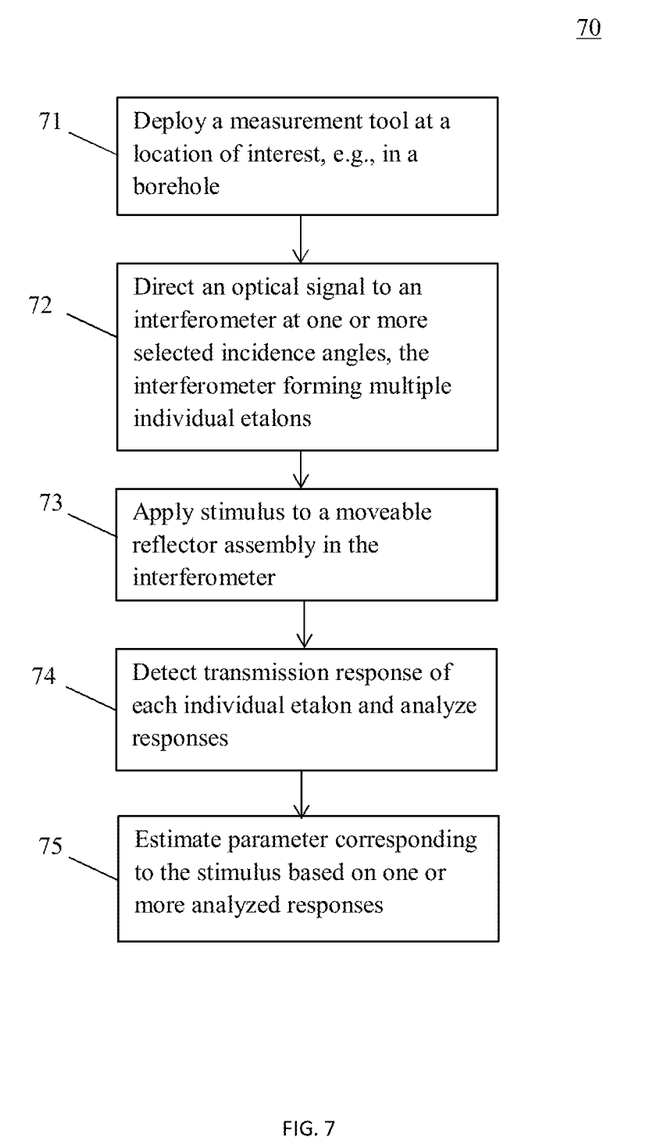
FIG. 7 is a flow diagram depicting an embodiment of a method of performing measurements using a multi-cavity optical interferometer.

FIG. 7 illustrates a method 70 for performing measurements using optical interferometry, such as acceleration and gravitational measurements. The method 70 includes one or more stages 71-75. The method 70 may be performed at least partially by a processor or processing device (e.g., the surface processing unit 24 and/or the downhole electronics unit 28). The method 70 is described herein in conjunction with the system 10 and/or the interferometer 40, although the method 70 may be performed in conjunction with any number and configuration of measurement devices configured to perform measurements using interferometers as described herein. In one embodiment, the method 70 includes the execution of all of stages 71-75 in the order described. However, certain stages may be omitted, stages may be added, or the order of the stages changed.

In the first stage 71, at least one measurement tool is deployed at a measurement location. In one embodiment, the tool is disposed in a borehole and advanced through the borehole via a wireline or other carrier. Although the stages described herein are described in the context of a downhole gravitational survey, they are not so limited. The method 70 can be applied to surface measurements. In addition, the method 70 may be used to measure other parameters or formation properties, such as acoustic or seismic properties, displacement or deformation of downhole components, vibration and pressure.

In the second stage 72, an optical signal (also referred to as a beam) is directed to the interferometer 40, and partially transmitted to the detector array 56. In one embodiment, the optical signal is applied at a selected incidence angle $\theta$. A beam having a single incidence angle is applied, or a plurality of beams having different incident angles may be applied to the interferometer. In one embodiment, the optical signal is an at least substantially monochromatic signal, however in other embodiments one or more beams having multiple wavelengths are applied.

In the third stage 73, a stimulus is applied to the interferometer 40 that causes the moveable reflector assembly 44 to move relative to the fixed reflector assembly 42. For example, the moveable reflector assembly is attached to a spring, proof mass or attached to a downhole component. The stimulus in such as example includes vibration, acceleration, gravity changes and/or pressure changes.

In the fourth stage 74, the transmission response in the form of an optical signal (i.e., interference patterns) is detected for each individual etalon and interference patterns are transmitted to a processing device for analysis. In one embodiment, photodetectors detect a transmission response of each individual etalon, and the transmission responses are processed as further discussed below to select transmission responses having the greatest sensitivity to the stimulus.

In the fifth stage 75, the detected signals are combined to generate a parameter value. For example, distances between fringes are estimated and correlated to a change in the cavity length. The change in the cavity length is further associated with a parameter value or parameter change, such as a change in acceleration.

Figure 8:
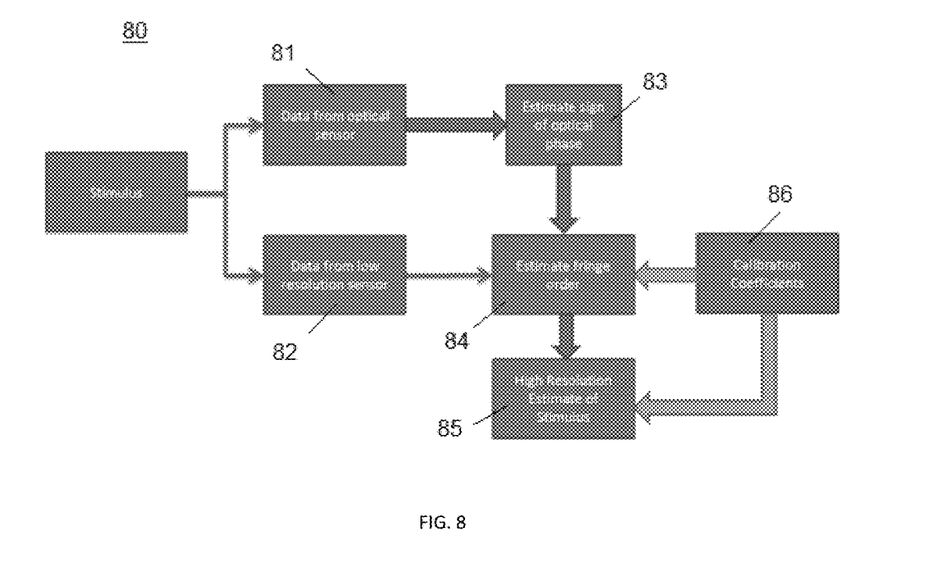
FIG. 8 is a flow diagram depicting an embodiment of a method of method of processing and analyzing data received from a multi-cavity optical interferometer.

FIG. 8 is a flow chart representing an embodiment of a method of processing and analyzing data received from the interferometer 40. A stimulus is applied to the moveable reflector assembly, which changes the cavity lengths of all of the individual etalons simultaneously. At block 81, data from photodetectors associated with each individual etalon is collected.

Figure 9:
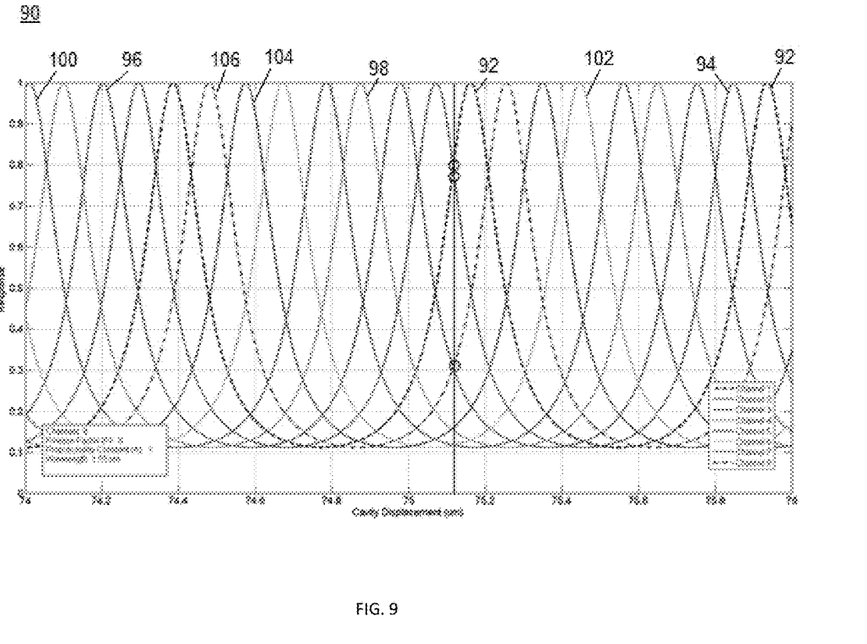
FIG. 9 depicts an example of fringe data generated by an embodiment of a multi-cavity interferometer.

An example of such data is shown in FIG. 9. In this example, the data is generated using an interferometer including a movable reflector assembly having eight surfaces (e.g., the assembly shown in FIG. 5). The coating thicknesses are varied according to equation (3) and the finesse factor is set equal to the number of channels or individual etalons (i.e., $F_p=8$).

In this example, each etalon is denoted as a channel 1 through 8 and generates a transmission response as a function of cavity length. Channels 1-8 produce transmission responses 92, 94, 96, 98, 100, 102, 104 and 106, respectively. The coating thicknesses are arranged so that channel 1 has the largest thickness (thus the smallest cavity length) and channel 8 has the smallest thickness (thus the largest cavity length).

Optionally, at block 82, an additional sensor (e.g., accelerometer, pressure sensors, strain sensor, etc.) is provided to generate a relatively low resolution measure of the change in cavity length. The sensor may have a resolution that is lower than the resolution of the interferometer, and is used to determine the fringe order of the transmission peaks (fringes) associated with each miniature etalon.

In the example of FIG. 9, the stimulus is acceleration and the interferometer 40 has a mechanical resonance of about 100 Hz. This corresponds to a cavity length change of about 25 μm per g, and to about 32 fringes (optical resonances) per g. Thus, an additional accelerometer is provided to detect acceleration to an accuracy of g/32 to uniquely estimate the set $\{m_p\}$.

The transmission response for each individual etalon may be represented by:

$$T_p = \frac{G_p I_0}{1 + F_p \sin^2\left(2\pi \frac{x_p}{\lambda_{\mathit{eff}}}\right)} = \frac{A_p}{1 + F_p \sin^2\left(2\pi \frac{x_p}{\lambda_{\mathit{eff}}}\right)}; \quad (4)$$

$$A_p = G_p / G_{\mathit{ref}}.$$

$x_p$ is the actual etalon gap for each miniature etalon p. $G_p$ represents the amplitude of the detected signal from a photodetector associated with a given etalon p. $\lambda_p$ is a constant of proportionality representing a ratio of the detected amplitude to a reference amplitude of the input optical beam or signal. For example, $G_p$ is the gain of a photodiode or other photodetector, $G_{\mathit{ref}}$ is the gain of the photodiode used to measure the input beam light intensity. $F_p$ is the finesse factor of each miniature etalon, which as related to the finesse of the interferometer by:

$$F = \left(\frac{2}{\pi}\mathfrak{F}\right)^2. \quad (7)$$

The constant $\lambda_p$ is used to reduce the effect of variations in light intensity coming from the light source. For example, the etalon channel data is divided by the reference data to derive the constant $\lambda_p$. Now the transmission response is independent of light intensity.

The gap for each etalon p is dependent on the stimulus input. The cavity distance or gap can be defined using a term, $x_0$, which is a gap distance common to all of the individual etalons, and a term $\Delta x_p$, unique to each individual etalon. The cavity distance $x_p$ for an individual etalon can be represented as:

$$x_p = x_0 + \Delta x_p + \frac{a}{\omega_0^2}; \quad (8)$$

$$0 \le \Delta x_p \le \lambda_{\mathit{eff}}/2.$$

In the above expression, the etalon's stimulus is acceleration a, but could be any stimulus. The term $\omega_0$ is the fundamental frequency of the mechanical system to acceleration.

At block 83, the optical response of each individual etalon is used to estimate the sign of the optical phase for each one. For example, solving for the response of the system, the optical phase angle $\varphi_p$ can be represented by:

$$\phi_p \equiv \arcsin\left(\sqrt{\frac{A_p - T_p}{T_p F_p}}\right). \quad (9)$$

At block 84, data from a low resolution sensor is combined with the optical phases to estimate the fringe order. At block 85, the optical phase and fringe order of the most sensitive channel and the calibration coefficients are used to obtain the high-resolution estimate of the cavity length and a corresponding stimulus value. In one embodiment, the fringe order is estimated in combination with calibration coefficients 86 determined from, e.g., experimental data.

In one embodiment, the expression for the cavity length is:

$$x_p = \frac{\lambda_{\mathit{eff}}}{2\pi}(m_p \pi + (-1)^{k_p} \phi_p), \quad (5)$$

where $m_p$ is an integer depending on the number of etalons, and $k_p$ is either zero or one. In order to uniquely identify the set $\{m_p\}$, the thicknesses and corresponding individual etalons are orders small to large, so that the following conditions apply:

$$m_1 \ge m_2 \ge \ldots \ge m_p;$$

$$m \le m_p + 1. \quad (6)$$

With these conditions it is possible to determine the set of $\{m_p\}$ to within a common integer. The low resolution sensor may be used to identify the displacement range of the moveable reflector assembly, and thereby unique identify the set of $\{m_p\}$ and identify the order of the fringes associated with each etalon.

The sign (or every $k_p$) associated with the optical phase angle of each etalon is determined by comparing signal levels of etalon responses that are adjacent in displacement. For example, as shown in FIG. 9, if the response of channel 1 (curve 92) at a particular displacement value is about 0.8 as shown, then the response of channel 8 (curve 106) could be near 0.3 or 0.78. In this example, the example it is 0.3, so $k_1=1$ and the sign the optical phase of channel 1 is negative.

Once the values for all $m_p$ and $k_p$ have been identified, the particular individual etalon may be chosen that has the largest sensitivity to the stimulus, i.e., the largest sensitivity to a selected displacement range of the interferometer. The displacement range may be based on, e.g., the mechanical resonances of the interferometer and/or device or component to be measured.

For example, once the most sensitive etalon is selected, the stimulus in the form of acceleration can be estimated based on:

$$\frac{a}{\omega_0^2} = \frac{\lambda_{\mathit{eff}}}{2\pi}(m_p \pi + (-1)^{k_p} \phi_p) - (x_0 + \Delta x_p). \quad (7)$$

In one embodiment, values of the parameters shown in equation (11) are subject to calibration. Various calibration parameters may be calculated using a known stimulus. It could be advantageous to do the calibration on sums and products of these parameters. For example, instead of estimating $x_0$ and the set of $\Delta x_p$ separately, it might be easier to estimate $x_0+\Delta x_p$).

In the example of an accelerometer, a number of calibration parameters may be used. Such parameters include one or more of $$\{A_p\}, \{\Delta x_p\}, \frac{\lambda_{eff}}{2\pi}\omega_0^2, \{F_p\}, x_0.$$

Other stimuli could be considered and this might change the number and significance of the calibration parameters.

In one embodiment, the angle and/or wavelength is not a single constant, but instead is applied as multiple variables. For example, instead of using a monochromatic light beam to probe the sensor, two or more wavelengths are applied to the interferometer. For example, one could use a beam locked to the one side of a gas absorption line, then switch for one side to the other side. The use of two or more wavelengths is advantageous in that the low resolution sensor can be eliminated. The second wavelength makes determining the order of the fringes possible. In other words, the absolute distance between the etalons can be made without the need to resort to a low resolution sensor to identify an approximate absolute distance.

Figure 10:
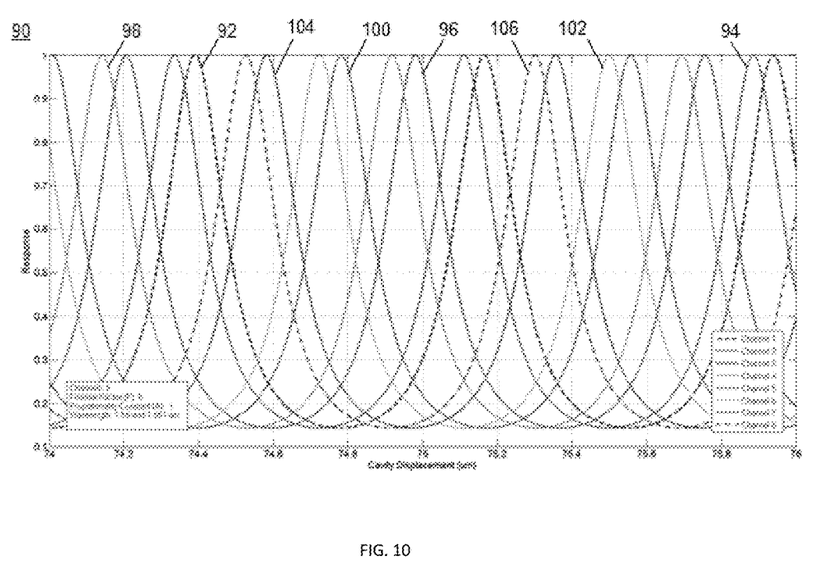
FIG. 10 depicts another example of fringe data generated by an embodiment of a multi-cavity interferometer.

In one embodiment, two light beams impinge on separate parts of the sensor. Each impinges at a different angle so that the effective wavelength of the light for each beam is different. This embodiment can also eliminate the need of a low resolution sensor and makes the determination of the fringe order possible. An example of a fringe pattern for embodiments using two wavelengths is shown in FIG. 10. In this example, the difference in effective wavelengths is 1 nm.

In another embodiment, at least two wavelengths impinge on the whole sensor simultaneously, separating the beams after they have exited the etalon and detecting each beam separately. This is possible using standard wavelength division multiplexing (WDM) and optical filtering technology. In the simplest example of the embodiment, the light from at least two locked lasers are combined by a fiber splitter into the input beam to the etalon. The output beam is split using a diffraction grating and detected by at least two photodetectors. Other embodiments will be apparent to those skilled in the art.

The systems and methods described herein provide various advantages over existing processing methods and devices. For example, interferometer assemblies described herein provide gravitational and other measurements having sufficient range and sensitivity without requiring complex configurations (e.g., multi-beam angles) or costly and technically challenging optical sources (e.g., femtosecond lasers). In addition, the relatively simple design, allow for much smaller interferometer devices than those using other techniques. In addition, embodiments described herein can make calibration much easier relative to prior art devices and techniques.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a parameter, comprising:
a light source configured to emit an optical signal;
an interferometer including a first reflector assembly having at least one reflective surface and a second reflector assembly having a plurality of individual reflective surfaces facing the at least one reflective surface, at least one of the first reflector assembly and the second reflector assembly being moveable in response to a stimulus, the plurality of individual reflective surfaces disposed at a fixed location relative to each other, each individual reflective surface defining a different optical cavity length relative to the first reflector assembly, wherein a number of the individual reflective surfaces is based on a finesse value of the interferometer; and
a processor configured to receive resultant signals transmitted from each cavity, and estimate a transmission response associated with each optical cavity length based on the resultant signals, the transmission response associated with each individual etalon based on a finesse factor of each individual etalon, wherein the processor estimates the transmission response based on the following relationship:

$$T_p = \frac{A_p}{1+F_p\sin^2\left(2\pi\frac{x_p}{\lambda_{eff}}\right)},$$

wherein $T_p$ is the transmission response associated with an individual reflective surface p, $F_p$ is a finesse factor of the reflective surface p, $x_p$ is the optical cavity length associated with the reflective surface p in response to the stimulus, $A_p$ is a ratio of an amplitude of the resultant signal associated with the reflective surface p to a reference signal, the reference signal based on an amplitude of the optical signal, and $\lambda_{eff}$ is an effective wavelength of the optical signal.

2. The apparatus of claim 1, wherein the plurality of individual reflective surfaces each define an etalon that forms a different cavity length and produces a different interferometer response to a single stimulus value.

3. The apparatus of claim 1, wherein the second reflector assembly includes a substrate and one or more reflective coatings, the one or more reflective coatings having a plurality of different thicknesses.

4. The apparatus of claim 1, wherein the plurality of individual reflective surfaces is a total number P of reflective surfaces, the total number P greater than or equal to the finesse value of the interferometer.

5. The apparatus of claim 4, wherein the fixed location of each individual reflective surface is selected based on the following relationship:

$$t_p = t_0 + \left(\frac{p}{P} + q\right)\frac{\lambda_{eff}}{2};$$
$$p \in \{1, 2, \ldots, P\}; q \in \{0, 1, 2, \ldots\}.,$$

wherein $t_p$ is the fixed location of an individual reflective surface p, $t_0$ is a base location, q is a selected thickness value, and $\lambda_{eff}$ is an effective wavelength of the optical signal.

6. The apparatus of claim 1, further comprising a processor configured to estimate a transmission response of the cavity associated with each of the plurality of individual reflective surfaces, and estimate a value of the stimulus based on the transmission response.

7. The apparatus of claim 6, wherein the processor is configured to select the cavity representing a highest response to the stimulus, and estimate the value of the stimulus based on the transmission response of the selected cavity.

8. The apparatus of claim 1, wherein the finesse factor is represented by the following equation:

$$F = \left(\frac{2}{\pi}\mathcal{F}\right)^2,$$

wherein F is the finesse factor and $\mathcal{F}$ is the finesse value.

9. A method of estimating a parameter, comprising:
directing an optical signal from a light source to an interferometer, the interferometer including a first reflector assembly having at least one reflective surface and a second reflector assembly having a plurality of individual reflective surfaces facing the at least one reflective surface, the plurality of individual reflective surfaces disposed at a fixed location relative to each other, each individual reflective surface defining a different optical cavity length relative to the first reflector assembly, wherein a number of the individual reflective surfaces is based on a finesse value of the interferometer;
moving at least one of the first reflective assembly and the second reflector assembly in response to a stimulus;
detecting resultant signals transmitted from each cavity; and
estimating by a processor a transmission response associated with each optical cavity length based on the resultant signals, and estimating a value of the stimulus based on the transmission response, the transmission response associated with each individual etalon based on a finesse factor of each individual etalon, wherein the transmission response is estimated based on the following relationship:

$$T_p = \frac{A_p}{1 + F_p \sin^2\left(2\pi \frac{x_p}{\lambda_{eff}}\right)},$$

wherein $T_p$ is the transmission response associated with an individual reflective surface p, $F_p$ is a finesse factor of the reflective surface p, $x_p$ is the optical cavity length associated with the reflective surface p in response to the stimulus, $A_p$ is a ratio of an amplitude of the resultant signal associated with the reflective surface p to a reference signal, the reference signal based on an amplitude of the optical signal, and $\lambda_{eff}$ is an effective wavelength of the optical signal.

10. The method of claim 9, wherein the plurality of individual reflective surfaces each define an etalon that forms a different cavity length and produces a different interferometer response to a single stimulus value.

11. The method of claim 9, wherein the second reflector assembly includes a substrate and one or more reflective coatings, the one or more reflective coatings having a plurality of different thicknesses.

12. The method of claim 9, wherein the plurality of individual reflective surfaces is a total number P of reflective surfaces, the total number P greater than or equal to the finesse value of the interferometer.

13. The method of claim 12, wherein the fixed location of each reflective surface is selected based on the following relationship:

$$t_p = t_0 + \left(\frac{p}{P} + q\right)\frac{\lambda_{eff}}{2};$$
$$p \in \{1, 2, \ldots, P\}; q \in \{0, 1, 2, \ldots\}.,$$

wherein $t_p$ is the fixed location of an individual reflective surface p, $t_0$ is a base location, q is a selected thickness value, and $\lambda_{eff}$ is an effective wavelength of the optical signal.

14. The method of claim 13, wherein each individual reflective surface is formed by a reflective coating formed on a substrate, $t_p$ is a thickness of the optical coating forming the individual reflective surface p, and $t_0$ is a base thickness common to all of the plurality of individual reflective surfaces.

15. The method of claim 9, wherein estimating the value of the stimulus includes selecting the optical cavity length representing a highest response to the stimulus, and estimating the value of the stimulus based on the transmission response associated with the selected cavity.

16. The method of claim 9, wherein estimating the transmission response includes calculating the cavity length $x_p$ in response to the stimulus based on the following relationship:

$$x_p = \frac{\lambda_{eff}}{2\pi}(m_p \pi + (-1)^{k_p}\phi_p),$$

wherein $m_p$ is an integer depending on the number of the individual reflective surfaces, $k_p$ is zero or one, and $\varphi_p$ is a phase angle of the resultant signal associated with the reflective surface p.

17. The method of claim 16, wherein the phase angle is estimated based on the following relationship:

$$\phi_p \equiv \arcsin\left(\sqrt{\frac{A_p - T_p}{T_p F_p}}\right).$$

18. The method of claim 9, wherein estimating includes determining an order of fringes obtained from each optical cavity length relative to other fringes from other optical cavity lengths, and selecting the transmission response of the optical cavity length associated with fringes representing the largest sensitivity to the stimulus.

19. The method of claim 18, wherein the optical signal includes constituent signals having at least a first wavelength and a second wavelength different than the first wavelength, and estimating includes determining the order of fringes based on the first and second wavelengths.

* * * * *